United States Patent [19]

Larson et al.

[11] Patent Number: 4,992,803
[45] Date of Patent: Feb. 12, 1991

[54] SIMULTANEOUS LASER WRITING OF MULTIPLE LALC CELLS

[75] Inventors: Brent D. Larson, Bellbrook; Benjamin C. Stone, Alpha, both of Ohio

[73] Assignee: The Mead Corporation, Dayton, Ohio

[21] Appl. No.: 287,822

[22] Filed: Dec. 21, 1988

[51] Int. Cl.⁵ .................. G01D 9/00; G01D 15/16; G02F 1/13
[52] U.S. Cl. .................... 346/1.1; 346/108; 350/351; 350/331 R
[58] Field of Search .................. 346/107 R, 108, 160, 346/76 L, 1.1; 350/331 R, 330, 351; 430/20

[56] References Cited

U.S. PATENT DOCUMENTS

| | | | |
|---|---|---|---|
| 4,595,260 | 6/1986 | Kubota | 350/357 |
| 4,653,867 | 3/1987 | Urabe et al. | 350/351 |
| 4,689,482 | 8/1987 | Horikawa et al. | 250/205 |
| 4,786,146 | 11/1988 | Ledebuhr | 350/331 R |
| 4,788,560 | 11/1988 | Miura | 346/108 |
| 4,796,038 | 1/1989 | Allen | 346/108 |

OTHER PUBLICATIONS

Dewey, "Laser-Addressed Liquid Crystal Displays", Optical Engineering, 23(3), 230–240 (May/Jun. 1984).
The Mead Corporation, "Simultaneous Color Exposure System Using Mirrors in the Image Projection Space", Research Disclosure, Sep. 1987, Disc. No. 28112.

Primary Examiner—Mark J. Reinhart
Attorney, Agent, or Firm—Thomas A. Boshinski

[57] ABSTRACT

Multiple images may be written simultaneously onto at least one photosensitive surface by modulating first and second laser beams in accordance with image information corresponding to first and second images. The first beam is directed onto a scanning mirror at a first angle of incidence $A_1$, and the second beam is directed onto the same scanning mirror at a second angle of incidence $A_2$. The first beam is focussed from the scanning mirror onto the photosensitive surface to write the first image thereon. The second beam is focussed from the scanning mirror onto the liquid crystal surface to write the second image thereon spatially remote from the first image.

18 Claims, 3 Drawing Sheets

SIMULTANEOUS LASER WRITING OF MULTIPLE LALC CELLS

BACKGROUND OF THE INVENTION

The present invention relates generally to the writing of images and, more particularly, to the writing of images in liquid crystal cells using a laser beam.

It is well known to form visual images by exposing a photosensitive media to light carrying the image information to be recorded. Exposure light is directed to the media after it has been reflected from or transmitted through an information source. Such a source may be a photomask, with one specific example being a mask formed by a laser addressable liquid crystal (LALC) cell.

It is also known to write image information onto liquid crystal cells using a scanned laser beam modulated in accordance with the image to be written. When forming images in a photosensitive media, the written liquid crystal cell is used as a mask for transmission or reflection of exposure light. Examples of such systems may be found in Dewey, "Laser-Addressed Liquid Crystal Displays," *Optical Engineering* 23(3), 230-240 (May/June 1984).

If a color image is to be reproduced in the media, at least three liquid crystal cells are used, each cell forming a mask corresponding to one of the three primary colors. The three masks may then be used in exposing the media, either simultaneously or sequentially, to exposure light of the primary colors.

For color images, it is typical to use a single laser writing system to write the three laser addressed liquid crystal (LALC) cells. The cells are written sequentially so that the overall writing time for a complete image is relatively lengthy, i.e., three times that required for a single cell. Simply providing three writing systems is impractical, particularly due to the expense of the galvo mirror typically used in laser scanning and the lens system used to focus the beam onto the mask surface.

A further problem in writing multiple images corresponding to color components of a full-color image is that proper registration between the multiple cells must be achieved. This is true regardless of whether a single writing system is used sequentially or multiple independent systems are used simultaneously. Otherwise, the finished color image may exhibit misregistration between the colors. This has proved difficult, however, due at least in part to drifting of the galvanometer mirror typically used in laser scanning, as well as non-repeatability of cell positioning.

What is needed, therefore, is a method and apparatus for writing multiple images simultaneously onto multiple cells or discrete areas of a single cell. Registration between the images should be precise and repeatable. Further, the method and apparatus should be of reasonable cost and complexity.

SUMMARY OF THE INVENTION

The present invention provides a method and apparatus for writing multiple images simultaneously onto at least one photosensitive surface. The method includes the step of modulating a first laser beam in accordance with image information corresponding to a first image. A second laser beam is modulated in accordance with image information corresponding to a second image. The first laser beam is directed onto a scanning mirror at a first angle of incidence $A_1$, and the second laser beam is directed onto the same scanning mirror at a second angle of incidence $A_2$. The first laser beam is focussed from the scanning mirror onto the photosensitive surface to write the first image thereon. The second laser beam is focussed from the scanning mirror onto the photosensitive surface to write the second image thereon spatially remote from the first image.

Preferably, the individual images will correspond to color separations of a single, full-color image. Thus, it is anticipated that the method will normally be practiced wherein more than two beams, such as three or four, are used. However, the method, as well as the corresponding apparatus, are easily expanded to accommodate more than the two beams specifically described above, as will be recognized by those skilled in the art.

The first and second laser beams may be directed coincidentally onto the scanning mirror. In such a case, the angles of incidence of the beams on the mirror are not equal, i.e., $A_1 \neq A_2$.

In an alternative embodiment, an elongated scanning mirror may be used, the mirror having its scanning axis in the direction of elongation. The first and second laser beams are directed onto the scanning mirror to be separated on the mirror along the axis. In this embodiment, the angles of incidence may be such that either $A_1 = A_2$ or $A_1 \neq A_2$.

The invention also provides apparatus for writing multiple images simultaneously onto at least one photosensitive surface. The apparatus includes sources for producing first and second laser beams. An appropriate means is included for modulating the first beam in accordance with image information corresponding to a first image, as well as means for modulating the second laser beam in accordance with image information corresponding to a second image. A scanning mirror is provided with means for causing the scanning mirror to scan the photosensitive surface.

A first directing means directs the first laser beam from the first modulating means onto the scanning mirror at a first angle of incidence $A_1$, and a second directing means directs the second laser beam from the second modulating means onto the scanning mirror at a second angle of incidence $A_2$.

A first focussing means receives the first laser beam from the scanning mirror and focusses it onto the photosensitive surface to write the first image thereon. A second focussing means receives the second laser beam from the scanning mirror and focusses the second laser beam onto the liquid crystal surface to write the second image thereon spatially remote from the first image.

In one preferred embodiment, the first and second focussing means are together a single lens. The angular separation of the laser beams directed onto the scanning mirror is maintained as the beams leave the mirror. The beams may then pass through the single lens to be focussed onto discrete locations on the photosensitive surface.

Accordingly, it is an object of the present invention to provide a method and apparatus for writing multiple images onto one or more liquid crystal cells; to provide such a method and apparatus which writes such images simultaneously to reduce the total writing time required for producing such images; to provide such a method and apparatus which can write simultaneous images while sharing for the individual images certain expensive and/or complex system components; to provide such a method and apparatus which is particularly adapted to produce individual images which form the color separations of a full-color image; and to provide such a method and apparatus which is particularly suited for producing written liquid crystal cells which can be used as photomasks in an image projecting system.

Other objects and advantages of the present invention will be readily apparent from the following description, he accompanying drawings, and the appended claims.

DETAILED DESCRIPTION OF THE PREFERRED EMBODIMENTS

Figure 1:
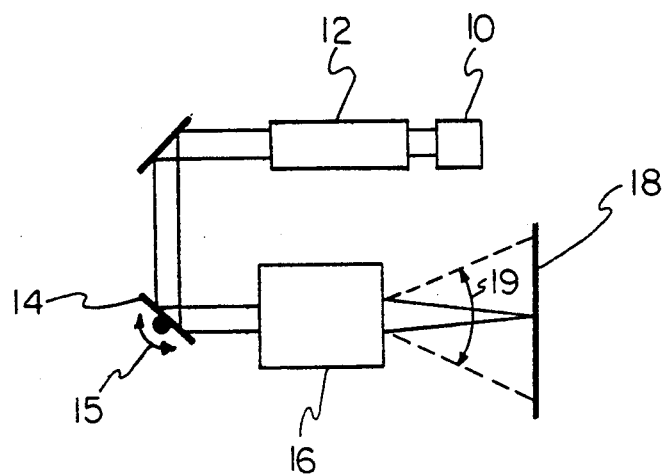
FIG. 1 is a schematic diagram of a prior art liquid crystal cell writing system.

The present invention can perhaps be best understood by first considering a known liquid crystal writing system as shown in FIG. 1. Radiation from a conventional diode laser 10 is collimated and shaped by beam shaping optics 12. This beam is directed onto a single axis galvanometer mirror 14 at the entrance pupil of a flat field F-theta lens 16. Galvo mirror 14 is scannable in the directions generally indicated by the double-headed arrow 15. The beam is focused by lens 16 onto an appropriate, conventional LALC cell 18 at the image plane of lens 16. The galvanometer causes the beam to sweep, as indicated by arrow 19, a raster line of the image as the laser 10 is modulated to write image data. Line advance in writing the image is accomplished by physically advancing cell 18 in the direction perpendicular to the plane of the drawing, preferably by means of a lead screw and stepping motor combination (not shown).

In accordance with the present invention, simultaneous writing of multiple images is accomplished by combining several beams onto a single galvo mirror. The several beams are in turn focussed onto the cell or cells, preferably through a single F-theta lens. Such a system requires but a single galvo mirror, typically the most expensive single component of a cell-writing system. Such a system also permits the use of the full field of the lens, rather than just one axis. The angle of the incoming beams determines a positional offset between each of the scan lines produced by the beams.

Figure 2:
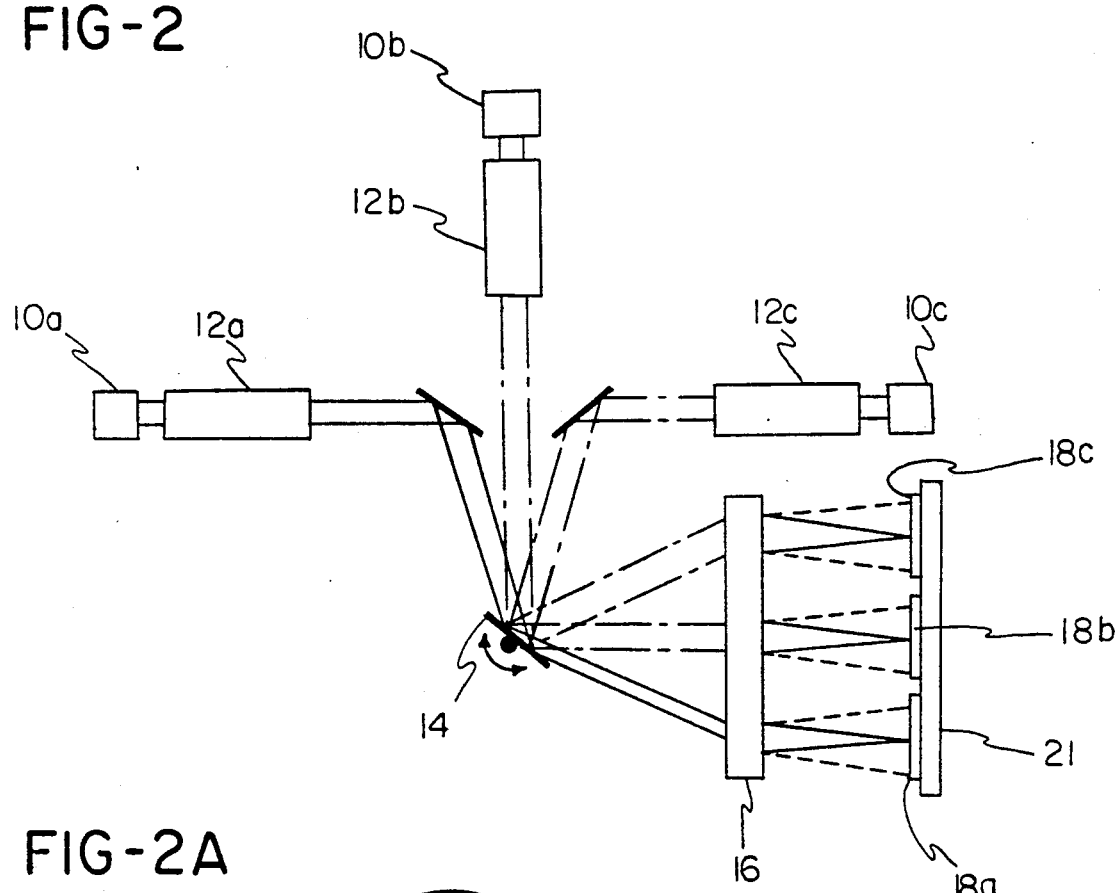
FIG. 2 is a schematic diagram of a liquid crystal cell writing system in accordance with the present invention.

A system in accordance with the invention is shown in FIG. 2. Three beams are shown, with one beam each used to write the blue, and red components of the complete color image onto separate LALC cells. Lasers 10a, 10b and 10c generate beams which are directed onto the same position on scanning galvo mirror 14. However, since each beam is directed onto mirror 14, the angular spacing of the beams is maintained as the beams are directed from mirror 14 into lens 16. From lens 16, the three beams are focussed onto three cells 18a, 18b and 18c. The cells are preferably mounted to a frame 21 to fix the cells in their relative positions.

Figure 2A:
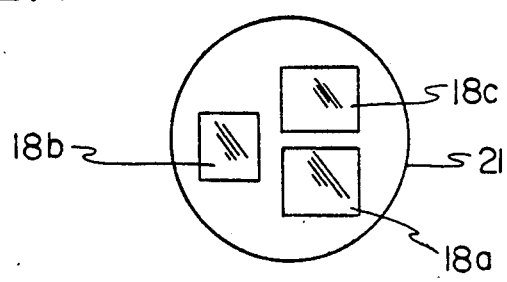
FIG. 2A is a plan view of a cell assembly comprising a frame and three liquid crystal cells.

Cells 18a, 18b and 18c are shown in a linear arrangement in FIG. 2 for clarity. In a practical, preferred embodiment, the cells are arranged on frame 21 as shown in FIG. 2A. As will be recognized by those skilled in the art, such an arrangement makes more efficient use of the field of view of lens 16.

Any appropriate LALC cells may be used with the present invention. One example is described in U.S. Pat. No. 4,787,713. Further, while the examples described herein all utilize cells which operate in a transmissive mode for projection of the written information, it will be readily recognized by those skilled in the art that reflective cells may be used as well.

While the embodiment of FIG. 2 requires separate lasers and beam-shaping optics for each beam, the most expensive elements of the system, i.e., the galvanometer and the F-theta lens, are shared.

A number of variations on the present invention are possible and will be readily apparent to those skilled in the art. If the image areas on the cells are small enough that all fit within the field of view of the lens 16, all that is required is careful positioning of the angles of the collimated laser beams. Such a system is depicted in FIG. 2.

Figure 2B:
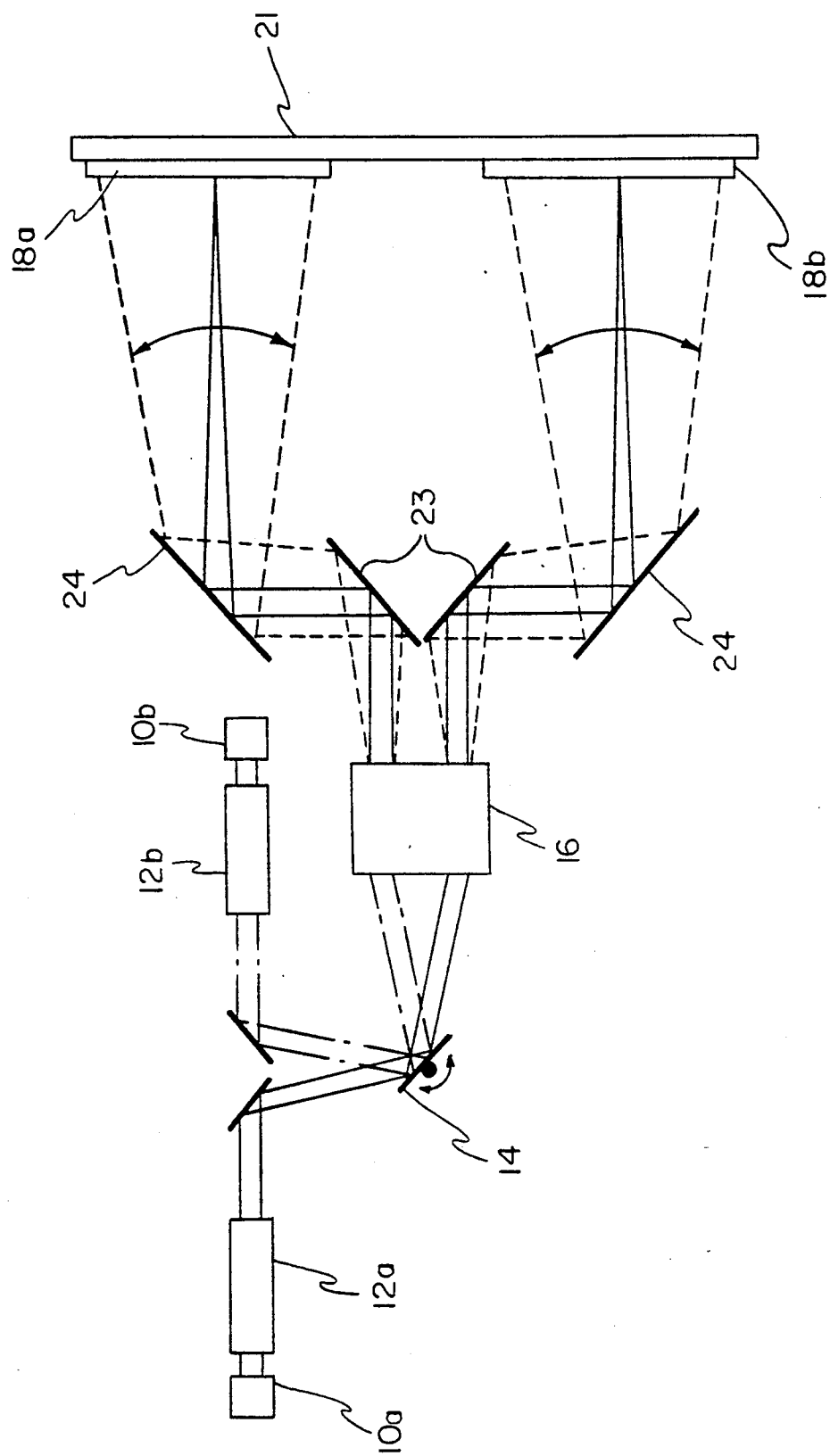
FIG. 2B is a diagram similar to FIG. 2, showing a variation on the embodiment of FIG. 2.

If the image areas are too large, folding mirrors can be used, positioned between the lens and liquid crystal cells. Such a system is shown in FIG. 2B. Only two beams are shown for clarity, but it will be recognized that a practical system may again require at least three beams. Reference numerals used in FIG. 2B correspond to those of FIG. 2, with like numerals referring to like parts. Upon emerging from lens 16, the beams are directed by folding mirrors 23 and 24 to cells 18a and 18b. As can be seen the use of mirrors 23 and 24 enables cells of larger area to be used. In this case, the constraint on image size is imposed by the focal length of the lens, and to a lesser extent, by the diameter of the beams as they exit the lens.

It is desirable to avoid reversing any of the images using mirrors, unless all color separations are reversed in the same way. In this way, tolerance of pixel placement is much more lenient.

Figure 3:
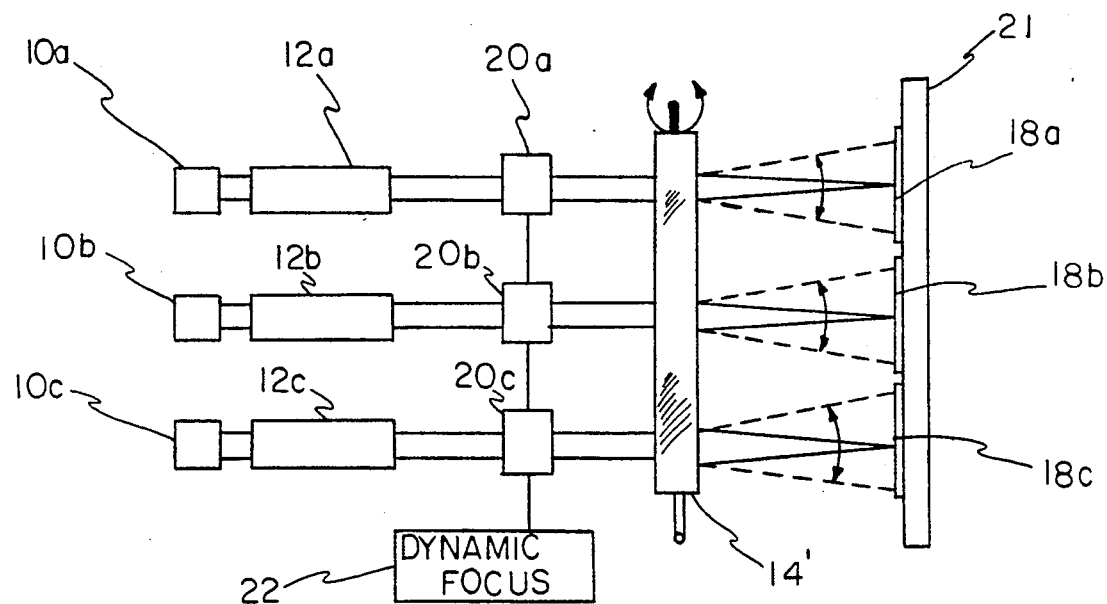
FIG. 3 is a schematic diagram illustrating an alternative embodiment for the cell writing system of the present invention.

An alternative embodiment of the present invention for simultaneous laser writing of multiple cells is shown by reference to FIG. 3. In this case, a special, elongated galvo mirror 14' is used, with three writing beams from lasers 10a, 10b, and 10c being swept by the single mirror 14'. In this case, each beam is reflected from mirror 14' in a discrete location.

Rather than a shared F-theta lens, each beam is provided with its own focus lens 20a, 20b, and 20c, respectively. A single dynamic focus mechanism 22 is used to actuate all three lenses. The cells 18a, 18b and 18c are all rigidly mounted on frame 21, positioned suitably for later projection by a printer. The spacing of the writing beams is chosen to match the cell positions, so that re-registration of the cells for projection is not necessary.

In either of the above embodiments, the liquid crystal masks may be discrete cells mounted to a common rigid support, as shown, or alternatively, a single large cell. The mask assembly can be shuttled between the cell writing system and a projection printer, either manually or mechanically.

Figure 4:
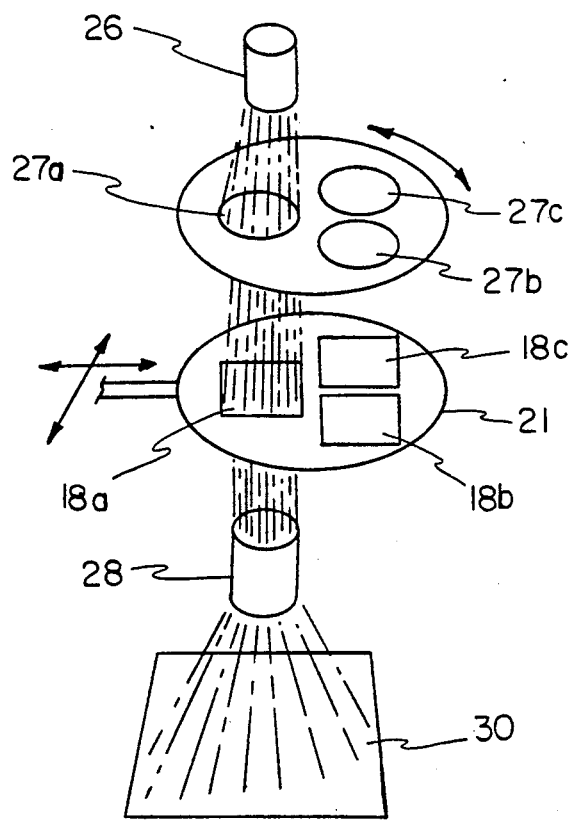
FIG. 4 is a schematic representation of an exemplary projection system for use with the written cells.

Projection of the images written on the cells onto a photosensitive media to form the full color image may be performed by any conventional means. One example of an appropriate projection system is shown in FIG. 4, wherein the three cells 18a, 18b and 18c are shown supported by frame 21. (Supporting structure for the various system components have been omitted for clarity.) A projection lamp 26 directs a projection beam through a color filter 27a onto cell 18a. The beam then passes through projection lens 28, whereafter the beam is projected onto an image plane. A sheet of photosensitive material 30 is located within this plane, and the first color separation is exposed on this media. Filter 27b is then selected, and frame 21 is moved so that the separation image written onto cell 18b is projected onto the material 30. Finally, the projection beam is directed through cell 18c to write the third separation onto the media, yielding a full color image.

Other projection systems may also be used with the masks formed by cells 18a, 18b and 18c, and the particular system used will depend upon whether cells 18a, 18b and 18c operate for projection in a transmissive mode, as shown, or in a reflective mode. Appropriate systems will be apparent to those skilled in the art. One further example, which requires only a single projection lens, can be seen by reference to the article "Color Exposure System Using Mirrors in the Image Projection Space", published in *Research Disclosure,* September 1987, Disclosure No. 28112.

It will also be recognized that the present invention can be used with any photosensitive material, provided that exposure light characteristics and exposure parameters are made proper for the particular media. However, one particular media for which the present invention is particularly appropriate is a microencapsulated, pressure-developed media developed by the Mead Corporation. Such media is described, for example, in U.S. Pat. Nos. 4,440,846 and 4,399,209.

While the methods and forms of apparatus herein described constitute preferred embodiments of this invention, it is to be understood that the invention is not limited to these precise methods and forms of apparatus, and that changes may be made therein without departing from the scope of the invention which is defined in the appended claims.

What is claimed is:

1. A method of writing multiple, discrete images simultaneously onto at least one photosensitive surface, comprising the steps of:
   modulating a first laser beam in accordance with image information corresponding to a first image, and simultaneously and independently modulating a second laser beam in accordance with image information corresponding to a second image;
   directing said first laser beam onto a scanning mirror at a first angle of incidence $A_1$, and simultaneously directing said second laser beam onto said scanning mirror at a second angle of incidence $A_2$;
   scanning said scanning mirror; and
   while scanning said scanning mirror, focusing said first laser beam from said scanning mirror onto said photosensitive surface to write said first image thereon, and simultaneously focusing said second laser beam from said scanning mirror onto said liquid crystal surface to write said second image thereon spatially remote from said first image.

2. A method as defined in claim 1 wherein said photosensitive surface is a liquid crystal surface.

3. A method as defined in claim 2 wherein said liquid crystal surface is formed as a single liquid crystal cell.

4. A method as defined in claim 2 wherein said liquid crystal surface is formed as multiple, discrete liquid crystal cells, said first image and said second image being formed in discrete ones of said cells.

5. A method as defined in claim 1 wherein said first laser beam and said second laser beam are d coincidentally onto said scanning mirror, and wherein $A_1 \neq A_2$.

6. A method as defined in claim 1 wherein said scanning mirror is an elongated mirror having an axis in the direction of elongation, and wherein said first and said second laser beams are directed onto said scanning mirror to be separated on said mirror along said axis.

7. A method as defined in claim 6 wherein $A_1 = A_2$.

8. A method as defined in claim 6 wherein $A_1 \neq A_2$.

9. Apparatus for writing multiple, discrete images simultaneously onto at least one photosensitive surface, comprising:
   a source for producing a first laser beam;
   means for modulating said first beam in accordance with image information corresponding to a first image;
   a source for producing a second laser beam;
   means for modulating said second laser beam independently of said first laser beam in accordance with image information corresponding to a second image;
   a scanning mirror;
   means for causing said scanning mirror to scan said photosensitive surface;
   first directing means for directing said first laser beam from said first modulating means onto said scanning mirror at a first angle of incidence $A_1$;
   second directing means for simultaneously directing said second laser beam from said second modulating means onto said scanning mirror at a second angle of incidence $A_2$;
   first focusing means for receiving said first laser beam from said scanning mirror and focusing said first laser beam onto said photosensitive surface to write said first image thereon; and
   second focusing means for simultaneously receiving said second laser beam from said scanning mirror and focusing said second laser beam onto said photosensitive surface to write said second image thereon spatially remote from said first image.

10. Apparatus as defined in claim 9 wherein said photosensitive surface is a liquid crystal surface.

11. Apparatus as defined in claim 10 wherein said liquid crystal surface is formed as a single liquid crystal cell.

12. Apparatus as defined in claim 10 wherein said liquid crystal surface is formed as multiple, discrete liquid crystal cells, said first image and said second image being formed in discrete ones of said cells.

13. Apparatus as defined in claim 9 wherein said first and second directing means directs said first and second laser beams, respectively, coincidentally onto said scanning mirror, and wherein $A_1 \neq A_2$.

14. Apparatus as defined in claim 9 wherein said scanning mirror is an elongated mirror having an axis in the direction of elongation, and wherein said first and second directing means directs said first and second laser beams onto said scanning mirror to be separated on said mirror along said axis.

15. Apparatus as defined in claim 14 wherein said first and second directing means directs said first and second laser beams such that $A_1 = A_2$.

16. Apparatus as defined in claim 14 wherein said first and second directing means directs said first and second laser beams such that $A_1 \neq A_2$.

17. Apparatus as defined in claim 9 wherein said first focussing means and said second focussing means are together a single lens.

18. Apparatus as defined in claim 9 wherein said first focussing means and said second focussing means are each separate and distinct focussing lenses.

* * * * *

UNITED STATES PATENT AND TRADEMARK OFFICE
CERTIFICATE OF CORRECTION

PATENT NO.   :   4,992,803
DATED        :   February 12, 1991
INVENTOR(S)  :   Brent D. Larson, Benjamin C. Stone It is certified that error appears in the above-identified patent and that said Letters Patent is hereby corrected as shown below:

Column 5, line 59, "liquid crystal" should read -- photosensitive --.

Column 6, line 2, "d" should read -- directed --.

Signed and Sealed this

Thirteenth Day of October, 1992

Attest:

DOUGLAS B. COMER

*Attesting Officer*    Acting Commissioner of Patents and Trademarks